US011886768B2

(12) United States Patent
Kumar et al.

(10) Patent No.: US 11,886,768 B2
(45) Date of Patent: Jan. 30, 2024

(54) REAL TIME GENERATIVE AUDIO FOR BRUSH AND CANVAS INTERACTION IN DIGITAL DRAWING

(71) Applicant: Adobe Inc., San Jose, CA (US)

(72) Inventors: Pranay Kumar, Noida (IN); Nipun Jindal, Delhi (IN)

(73) Assignee: Adobe Inc., San Jose, CA (US)

( * ) Notice: Subject to any disclaimer, the term of this patent is extended or adjusted under 35 U.S.C. 154(b) by 82 days.

(21) Appl. No.: 17/733,635

(22) Filed: Apr. 29, 2022

(65) Prior Publication Data

US 2023/0350634 A1 Nov. 2, 2023

(51) Int. Cl.
*G06F 3/16* (2006.01)
*G06N 3/04* (2023.01)
*G06F 3/04842* (2022.01)
*G06F 3/04883* (2022.01)

(52) U.S. Cl.
CPC ............ *G06F 3/16* (2013.01); *G06F 3/04842* (2013.01); *G06F 3/04883* (2013.01); *G06N 3/04* (2013.01)

(58) Field of Classification Search
None
See application file for complete search history.

(56) References Cited

U.S. PATENT DOCUMENTS

| 10,249,319 B1 * | 4/2019 | McCallum | G10L 21/0264 |
| 11,756,530 B2 * | 9/2023 | Tagliasacchi | G10L 25/30 |
| | | | 704/232 |
| 2003/0067450 A1 | 4/2003 | Thursfield et al. | |
| 2011/0320204 A1 * | 12/2011 | Locker | G06F 3/0416 |
| | | | 704/E13.011 |
| 2014/0253478 A1 * | 9/2014 | Jeong | G06F 3/16 |
| | | | 345/173 |
| 2014/0310631 A1 | 10/2014 | Harrison et al. | |

(Continued)

OTHER PUBLICATIONS

Broad et al., "Network Bending: Expressive Manipulation of Deep Generative Models", 10th International Conference on Artificial Intelligence in Music, Sound, Art and Design, EvoMUSART 2021, pp. 1-13.

(Continued)

*Primary Examiner* — Tuan S Nguyen
(74) *Attorney, Agent, or Firm* — Nicholson De Vos Webster & Elliott LLP

(57) ABSTRACT

Embodiments are disclosed for real time generative audio for brush and canvas interaction in digital drawing. The method may include receiving a user input and a selection of a tool for generating audio for a digital drawing interaction. The method may further include generating intermediary audio data based on the user input and the tool selection, wherein the intermediary audio data includes a pitch and a frequency. The method may further include processing, by a trained audio transformation model and through a series of one or more layers of the trained audio transformation model, the intermediary audio data. The method may further include adjusting the series of one or more layers of the trained audio transformation model to include one or more additional layers to produce an adjusted audio transformation model. The method may further include generating, by the adjusted audio transformation model, an audio sample based on the intermediary audio data.

20 Claims, 10 Drawing Sheets

(56) References Cited

U.S. PATENT DOCUMENTS

2019/0188831 A1    6/2019  Chen et al.
2023/0110255 A1*   4/2023  Chen ....................... G10L 19/02
                                                    704/500

OTHER PUBLICATIONS

Carney et al., "Tone Transfer: In-Browser Interactive Neural Audio Synthesis", Joint Proceedings of the ACM IUI 2021 Workshops, Apr. 13-17, 2021, 6 pages.
Ganis et al. "Real-Time Timbre Transfer and Sound Synthesis Using DDSP", arXiv:2103.07220v1 [cs.SD], Mar. 12, 2021, pp. 1-11.
Hayes et al., "Neural Waveshaping Synthesis", arXiv:2107.05050v2 [cs.SD], Jul. 27, 2021, 8 pages.
Combined Search and Examination Report, GB App. No. 2302792.3, dated Aug. 15, 2023, 7 pages.

* cited by examiner

REAL TIME GENERATIVE AUDIO FOR BRUSH AND CANVAS INTERACTION IN DIGITAL DRAWING

BACKGROUND

In digital drawing, accurate real time audio and visual feedback is one of the most challenging aspects to produce because of the complex interactions involved with canvases and tools used with drawing. Further challenges are presented because a digital canvas can represent many different physical materials and a digital drawing tool can represent many different types of physical drawing tools. A digital drawing tool and a digital canvas allows the user to customize the appearance of the drawing by simulating the different physical tools and material but provide limited or no audio feedback. Audio feedback provides information to the user about the pressure, direction, and stroke information that is present in a physical drawing but is lacking in digital drawing.

SUMMARY

Introduced here are techniques/technologies that relate to digital drawing and producing real time generative audio for brush and canvas interaction in a digital drawing. An electronic drawing system receives a selection of a type of digital canvas and a digital drawing tool. The drawing input is received from the user by an interaction between the digital drawing tool and the digital canvas. A set of parameters that represent a drawing intent such as pressure, velocity, azimuth for the drawing input is generated by the electronic drawing system. An audio output is created by leveraging a neural network that is manipulated using network bending that incorporates the set of parameters for real time drawing inputs with a neural network that is trained to produce audio for a particular combination of drawing tool and digital canvas.

The electronic drawing system applies a neural network such as an audio transformer that generates an intermediate audio waveform that corresponds to a particular combination of digital canvas and digital drawing tool. Network bending is applied to the neural network to insert one or more distinct layers into the neural network to manipulate the intermediate waveform based on the set of parameters representing the drawing intent.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
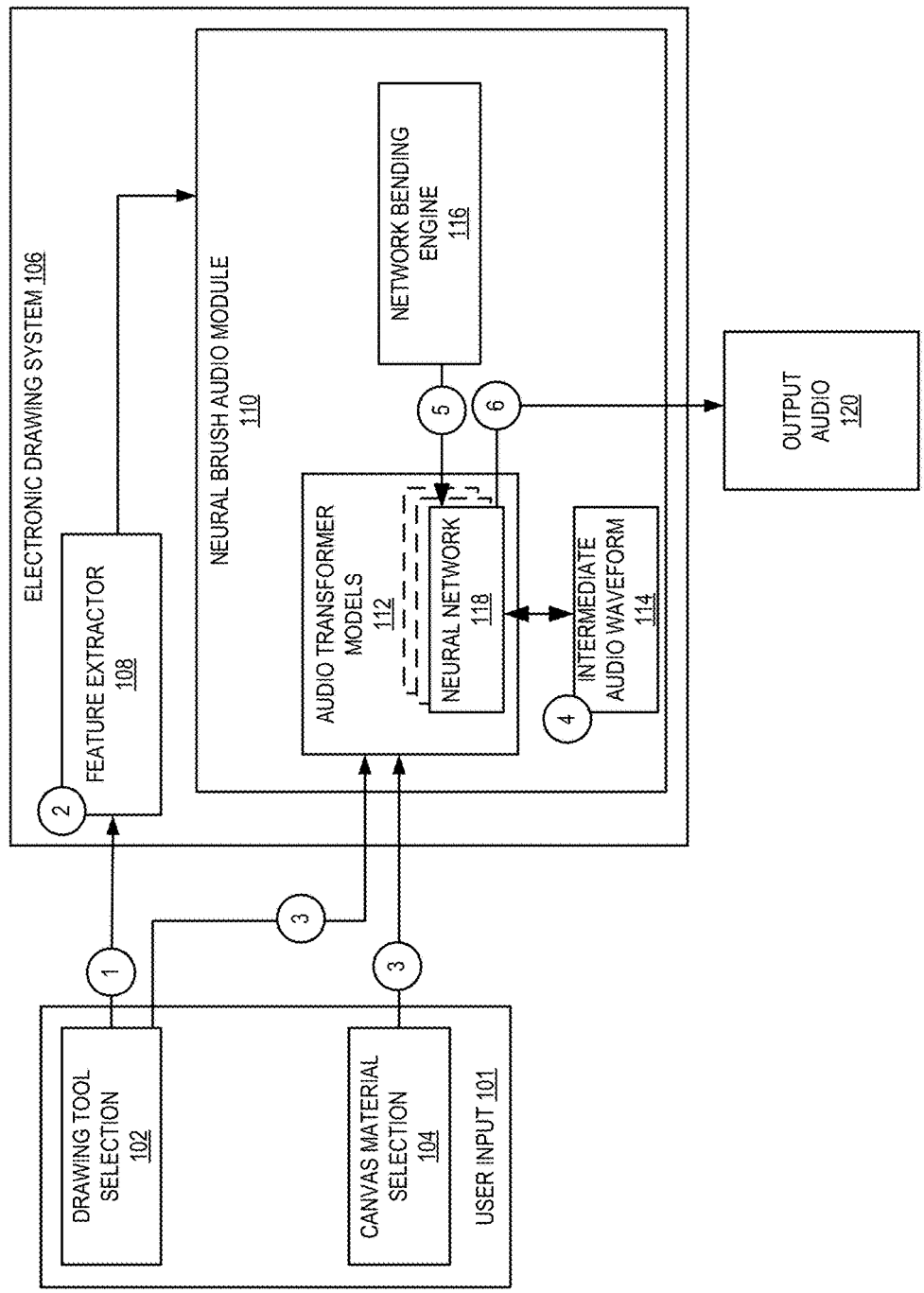
FIG. 1 illustrates a diagram of a process of real time generative audio for brush and canvas interaction in digital drawing in accordance with one or more embodiments.

One or more embodiments of the present disclosure include an electronic drawing system that generates a real time audio output for a drawing input of a drawing tool on a digital canvas in electronic drawing. Embodiments manipulate a neural network, using the drawing inputs, to provide audio that represents the real time drawing inputs in the context of the particular drawing tool and digital canvas.

For example, the electronic drawing system receives a selection of a type of a digital canvas and a selection of a drawing tool. A neural network of the electronic drawing system is trained to generate an intermediate audio waveform for each combination of digital canvas and drawing tool. The electronic drawing system captures the drawing inputs and generates a set of parameters to represent a pressure, velocity, azimuth of the stylus on the input surface. The electronic drawing system applies network bending based on the drawing inputs to the neural network that corresponds to the drawing tool and digital canvas.

As discussed, conventional techniques lack the ability to generate real time audio that corresponds to a combination of digital canvas, digital drawing tool, and the drawing inputs of the user. As a result, conventional systems produce generic audio waveforms or generic transformations of user inputs such as tone transfer of audio input. This results in an inaccurate or missing audio and visual feedback that does not represent the real time digital drawing inputs. Without audio feedback that corresponds to the visual appearance of the drawing, such as the sound of using chalk on a chalkboard, the audio/visual experience of digital drawing is degraded.

To address these and other deficiencies in conventional systems, embodiments perform real time generation of audio feedback based on a user's input and a trained neural network. The audio feedback is generated by a neural network that is trained on a combination of canvas and drawing tool. The neural network is modified, at inference time, to produce real time feedback responsive to the user's input by inserting layers into the neural network based on a set of parameters that are extracted from a drawing input.

This provides a realistic real time audio feedback that represents the user's drawing inputs with the canvas and drawing tool, unlike prior techniques which are unable to provide feedback specific to the user inputs. Although embodiments are generally described with respect to drawings, embodiments may be used with animation, graphic editing, or manipulation of other content using an electronic tool and an electronic surface (e.g., sewing a representation of fabric with a digital needle tool, hammering a representation of a metal sheet with a digital hammer tool, etc.).

Embodiments generate audio feedback representing the user's input with an electronic drawing tool in real time. Generating audio feedback in real-time provides the user a realistic experience of drawing with auditory feedback of the drawing tool on the drawing surface. Typical electronic drawing systems have generic noises for specific tools but are not incorporating the user's real time input. Aspects of the present disclosure use network bending to insert discrete layers into an audio generator, during inference, to provide precise manipulation of the audio generator in real time to produce a sound corresponding to the speed, pressure, and direction of the user's drawing inputs.

FIG. 1 illustrates a diagram of a process of real time generative audio for brush and canvas interaction in digital drawing in accordance with one or more embodiments. As depicted in FIG. 1, an electronic drawing system 106 includes a feature extractor 108 and a neural brush audio module 110 that includes audio transformer models 112, intermediate audio waveforms 114, and network bending engine 116.

The electronic drawing system 106 receives a user input 101 identifying a drawing tool 102 and a digital canvas 104. A drawing tool 102 includes a digital representation such as a cursor on a user interface of a physical drawing tool that is used for physical drawing on a physical material. The drawing tool 102 includes representations for any kind of physical drawing tool and can include icons, graphics, or features that indicate a particular physical drawing tool that is being represented. In some embodiments, the drawing tool 102 represents input from an electronic pencil or stylus that interacts with an input surface of the electronic drawing system 106, such as a touchscreen of the electronic drawing system, or an input surface of a user device (e.g., a touchscreen of a mobile computing device, tablet, etc.). The electronic drawings system 106 also can receive a selection of a digital drawing tool to change physical implement represented by the drawing tool 102 (e.g., the drawing tool 102 may represent a charcoal pencil or a paint brush, etc.). The digital canvas 104 is selected from a plurality of digital canvas and represents a physical material upon which drawing is to be performed. Examples of physical materials represented by a digital canvas include, but are not limited to hardwood, cardboard, canvas, paper, brick, linen, or other physical materials.

At numeral 1, the electronic drawing system 106 receives inputs that are represented by actions of the drawing tool 102. The drawing tool 102 represents the input as a stroke that is defined by a set of parameters such as a pressure, an azimuth, a velocity. The electronic drawing system 106 is configurable to process strokes directly on a digital canvas 104. The electronic drawing system 106 can alternatively be executed on a client device as an application where it is configured to receive information from a user input device coupled to the client device.

Figure 2:
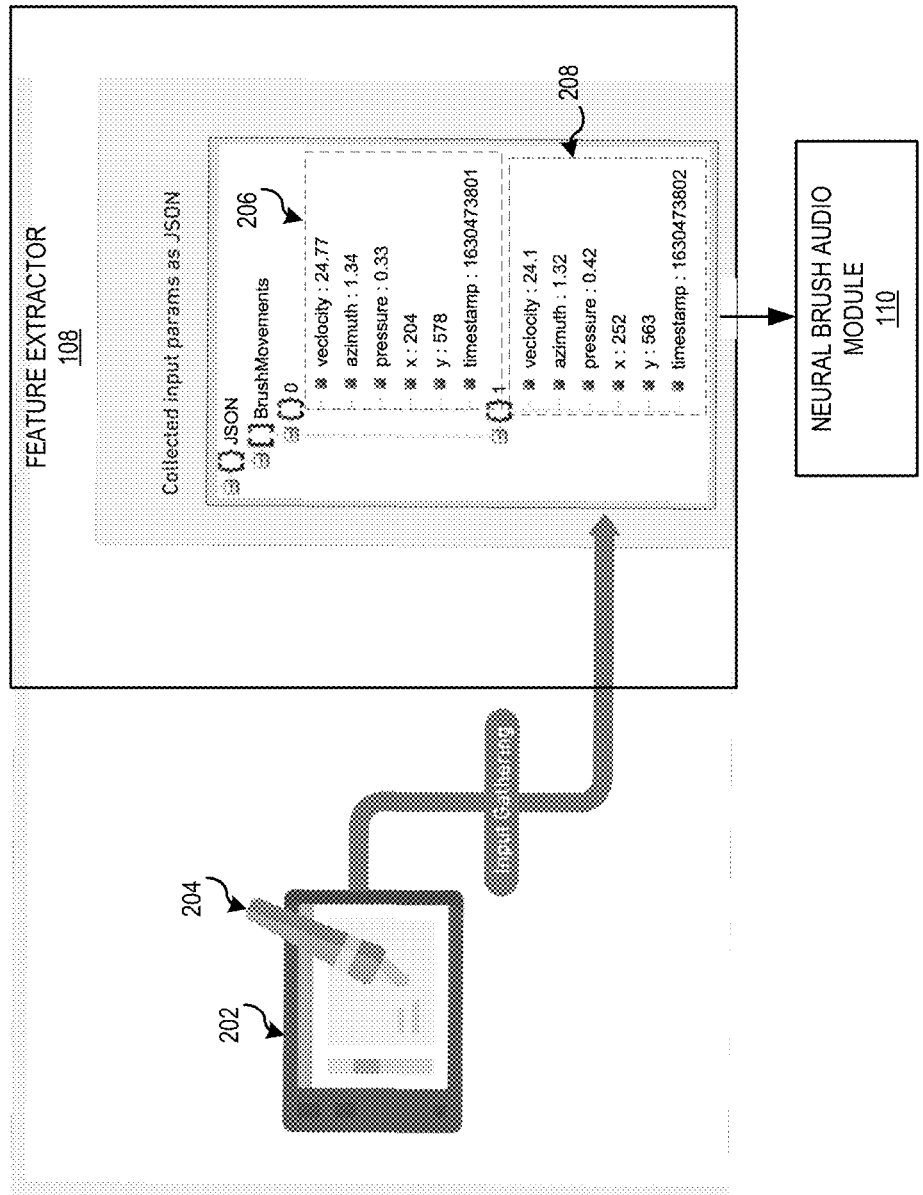
FIG. 2 illustrates an example of extracting parameters from digital drawing in accordance with one or more embodiments.

At numeral 2, The feature extractor 108 generates a set of parameters that represent the inputs represented by actions of the drawing tool 102. For example, the feature extractor 108 can extract location (e.g., x-coordinate, y-coordinate), a pressure, an azimuth of the input represented by drawing tool 102, a velocity, a timestamp, environmental factors, and other features. Briefly turning to FIG. 2, the process of extracting features is depicted. FIG. 2 illustrates an example of extracting parameters from digital drawing in accordance with one or more embodiments. An input surface 202 receives one or more strokes from the stylus 204 that is represented by drawing tool 102. The input surface 202 is communicatively coupled to the feature extractor 108. In some embodiments, the feature extractor 108 captures the features from a sensor of the input surface. The feature extractor 108 generates a first set of parameters 206 that represent a first stroke of the stylus 204 and a second set of parameters 208 that represent a second stroke of the stylus 204. The first set of parameters 206 and second set of parameters 208 may be validated by a pre-processing operation to remove noise, erroneous sensor information, or other data ingestion processing. Returning to FIG. 1, the feature extractor 108 outputs the first set of parameters and/or the second set of parameters to the neural brush audio module 110. The feature extractor 108 outputs the first set of parameters or second set of parameters in a data structure such as JSON, XML, or the like to the neural brush audio module 110.

At numeral 3, the neural brush audio module 110 receives inputs represented by the drawing tool 102 on the digital canvas 104. For example, the inputs can be a stroke, a tap, or another touch that are represented by moving the drawing tool 102 on the digital canvas 104. The neural brush audio module 110 includes a set of trained audio transformer models 112, intermediate audio waveforms 114, and network bending engine 116.

The audio transformer models 112 includes one or more trained neural networks 118, with each neural network 118 in audio transformer models 112 being trained for a combination of drawing tool and digital canvas. A non-limiting example of a combination of drawing tool and digital canvas includes a charcoal pencil on a hardwood table.

At numeral 4, the electronic drawing system 106 selects a neural network 118 from the audio transformer models 112 based on the combination of drawing tool 102 and the digital canvas 104. The neural network 118 generates an intermediate audio waveform 114 that maps the drawing tool 102 and digital canvas 104 to a sound by generating a sound associated with the combination of drawing tool 102 and digital canvas 104. Additional details of the audio transformer models 112 and neural network 118 is described at least with regard to FIG. 4. In some embodiments, the neural network 118 is an audio synthesizer such as a Neural Waveshaping Unit (NEWT) or can be configured to use Differentiable Digital Signal Processing (DDSP).

In one example, drawing inputs from drawing tool 102 include an azimuth, velocity, and brush pressure. The drawing inputs are received when a user moves the drawing tool in a stroke across the digital canvas 104. The electronic drawing system 106 computes a frequency and a loudness at each time interval. For instance, the frequency F can be represented as a relationship between azimuth ($a_t$) and velocity ($v_t$), such as: $F_t \propto a_t^2 * v_t$. The loudness L can be represented as a relationship between pressure ($p_t$) and velocity ($v_t$), such as: $L_t \propto p_t * (v_t)^{3/2}$. To generate the transformation layer, the input JSON parameters are applied to the intermediate audio waveform 114. For the transformation layer, the bandwidth parameter is fixed; however, the center frequency parameter and an overall gain parameter are dependent on azimuth, velocity, or pressure.

At numeral 5, the network bending engine 116 modifies the neural network 118 by inserting a plurality of deterministically controlled transformation layers into a computational graph associated with the neural network 118. The network bending engine 116 applies each deterministically controlled transformation layer to each activation map of the neural network 118 individually before the activation maps are passed to a subsequent layer of the neural network 118. Because the network bending engine 116 adjusts the activation maps individually, the transformation is applied to all features in the layer or a subset of the features in the layer. The insertion of the plurality of deterministically controlled transformation layers provides precision control of different transformations interacting with each other within the neural network 118. The network bending engine 116 can apply the transformation to a subset of features in the layer using a proximity of the features. In some examples, the transformation layer applies a scaling factor to the features of the activation map.

At numeral 6, the neural network 118 (including the additional transformation layers inserted at numeral 5) generates output audio 120 from the neural network 118. By including the additional transformation layers, the neural network 118 provides a mapping at inference time that manipulates the intermediate waveform into an output audio 120 that is modified by the drawing inputs in real-time. In some embodiments, the output audio 120 is presented to the user by a speaker of the electronic drawing system 106, or another audio presentation device coupled to the electronic drawing system 106.

Figure 3:
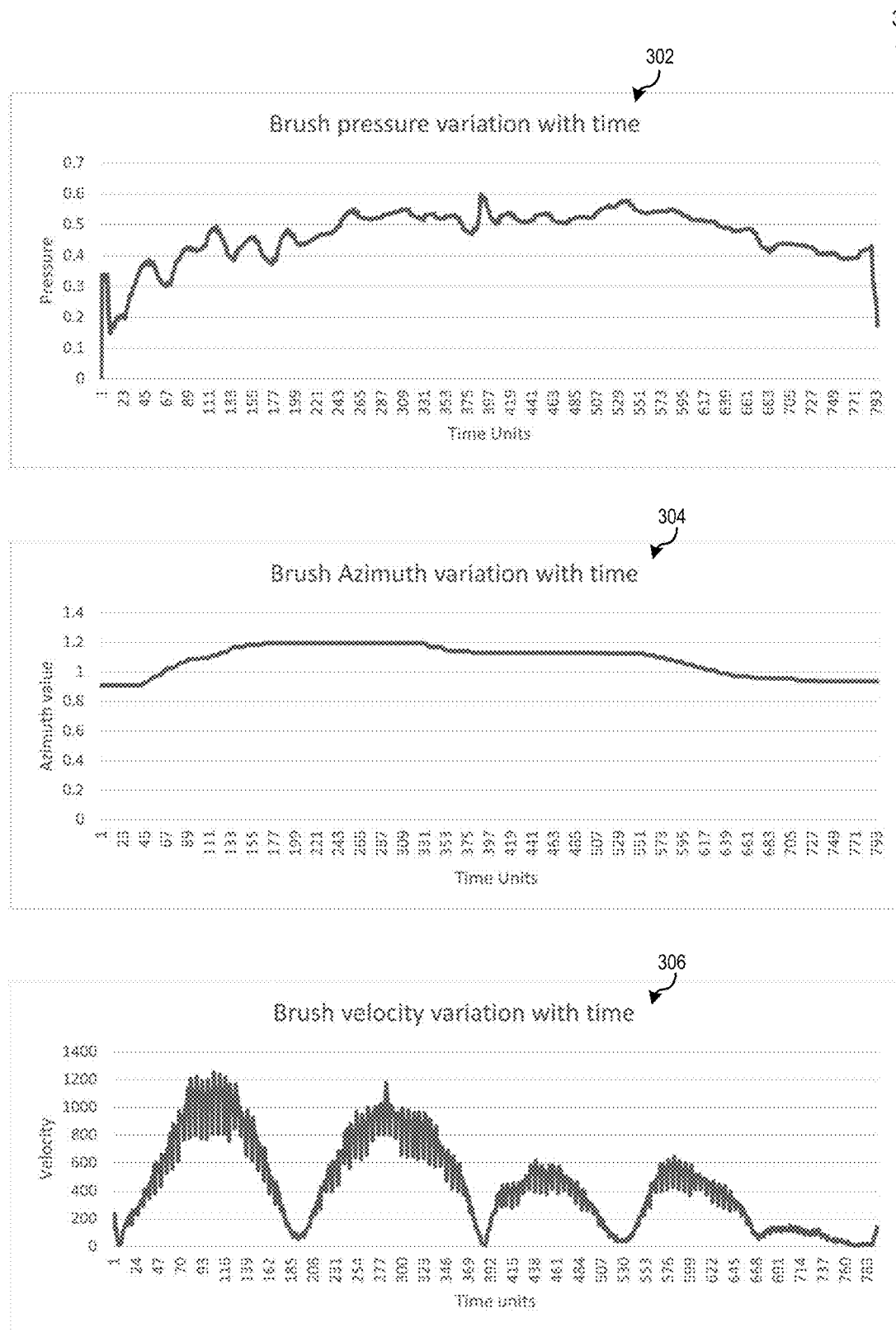
FIG. 3 illustrates an example of raw digital drawing measurements in accordance with one or more embodiments.

FIG. 3 illustrates an example of drawing inputs 300 in accordance with one or more embodiments. For example, the feature extractor captures parameters of the drawing inputs 300 based on an interaction between the drawing tool and the digital canvas. As illustrated in FIG. 3, the drawing inputs 300 include a drawing tool pressure 302, a drawing tool azimuth 304, and drawing tool velocity 306. In some embodiments, the drawing inputs 300 can be received by a sensor of the electronic drawing system, or a coupled input surface as described above. The electronic drawing system may perform pre-processing on the drawing inputs 300 to remove noise, erroneous sensor data, or perform a smoothing of the drawing inputs prior to inputting the drawing inputs 300 into the neural brush audio module 110.

Figure 4:
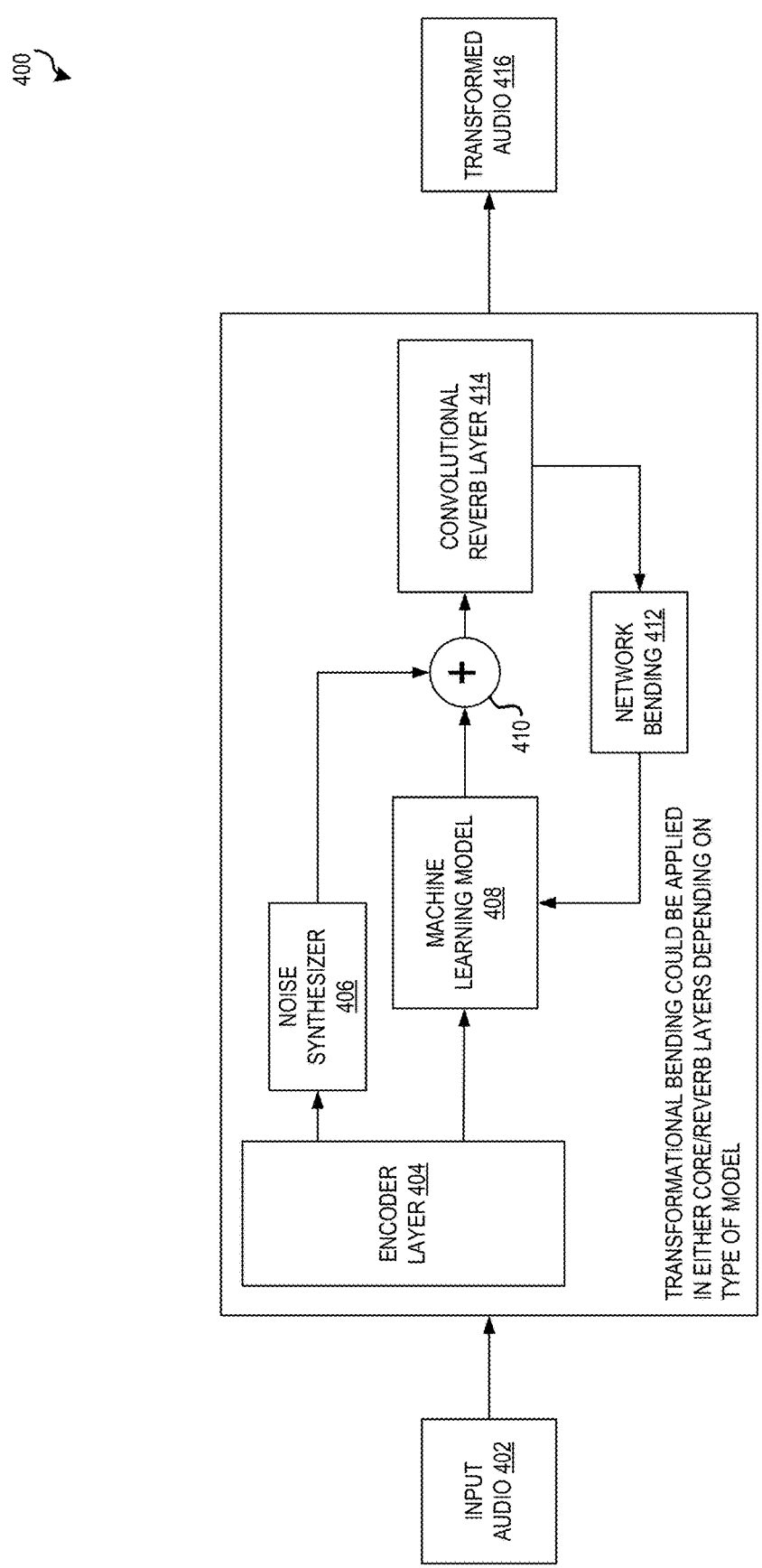
FIG. 4 depicts an example of a block diagram of a neural brush audio module including network bending in accordance with some embodiments.

FIG. 4 depicts an example of a block diagram of a neural brush audio module including network bending in accordance with some embodiments. The neural brush audio module 400 (such as neural brush audio module 110) includes an encoder layer 404, a noise synthesizer 406, machine learning model 408 (such as neural network 118), network bending 412 (such as network bending engine 116), combination operation 410, and convolutional reverb layer 414.

The encoder layer 404 receives input audio 402 (e.g., a generic white noise) and extracts one or more control signals from the input audio 402. The encoder layer 404 generates a control embedding from the control signals. In some embodiments, the encoder layer 404 includes a gated recurrent unit of any size.

The noise synthesizer 406 decomposes the input audio 402 into a harmonic portion and a residual portion. Noise synthesizer 406 models the residual portion with filtered noise using filter coefficients that are variable over time based on the spectrum of the residual portion. An example of the filter is a multilayer perceptron (MLP) with normalization. The noise synthesizer 406 applies the filter to the input audio 402 to generate an intermediate audio signal. An example of the input audio 402 is any generic sound (e.g., white noise, pink noise, random noise, etc.) that can be modified by the neural brush audio module to produce the intermediate audio signal that represents the combination of drawing tool and digital canvas.

The machine learning model 408 is an audio transformation model that generates intermediate audio from the output of the encoder layer 404. In some embodiments, the machine learning model 408 is a NEWT model. The machine learning model receives the output of the encoder layer 404 and applies a neural network, such as neural network 118, to the output of the encoder layer 404.

The network bending 412 inserts one or more additional transformation layers into the machine learning model 408 and/or the convolutional reverb layer 414. The network bending 412 inserts each transformation layer to the neural network for an individual activation map before the parameters of the machine learning model 408 is passed to a subsequent layer of the machine learning model 408 and/or the convolutional reverb layer 414. In some embodiments, during inferencing, the network bending 412 inserts additional layers into the machine learning model 408 or the convolutional reverb layer based on the real-time drawing inputs of the drawing tool on the digital canvas. By leveraging network bending, precise manipulation of the machine learning model 408 is possible during inference time such that the output of the machine learning model 408 corresponds to the real-time drawing inputs. In some embodiments, the network bending can include inserting one or more new layers in preconfigured locations between specific layers of the trained neural network. In other embodiments, the network bending can include determining locations for inserting the one or more new layers during inference of the machine learning model 408.

The output of the machine learning model 408 and the noise synthesizer 406 are combined at combination operation 410. In some embodiments, the combination operation 410 can be addition, concatenation, convolution, or any other known technique.

The convolutional reverb layer 414 modifies the output of combination operation 410 that combines the outputs of the noise synthesizer 406 and the machine learning model 408. The convolutional reverb layer 414 adjusts the audio signal to simulate acoustics of a physical environment. The convolutional reverb layer 414 outputs the transformed audio 416, which is subsequently output to the user via a speaker, sound system, or other sound presentation system.

Figure 5B:
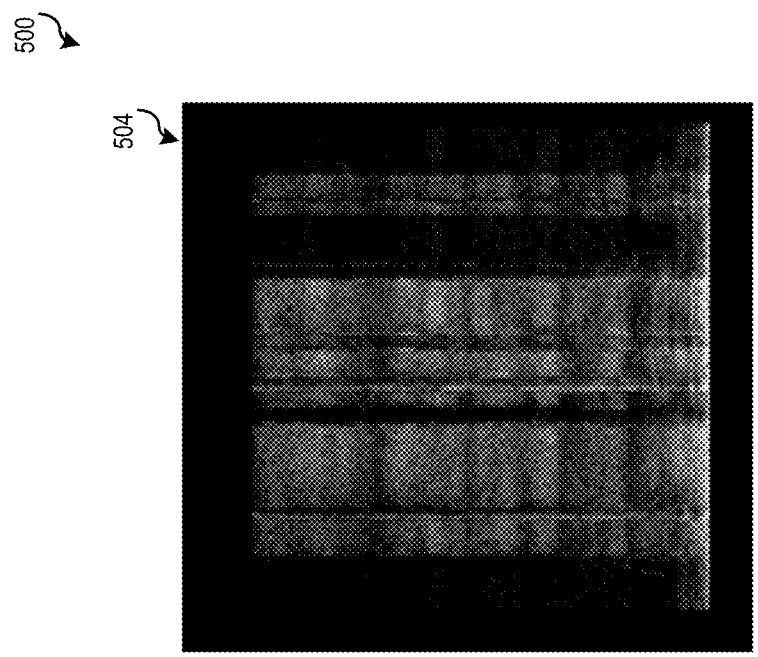
FIG. 5B illustrates an example of an output audio color spectrum generated by the electronic drawings system in accordance with some embodiments.
Figure 5A:
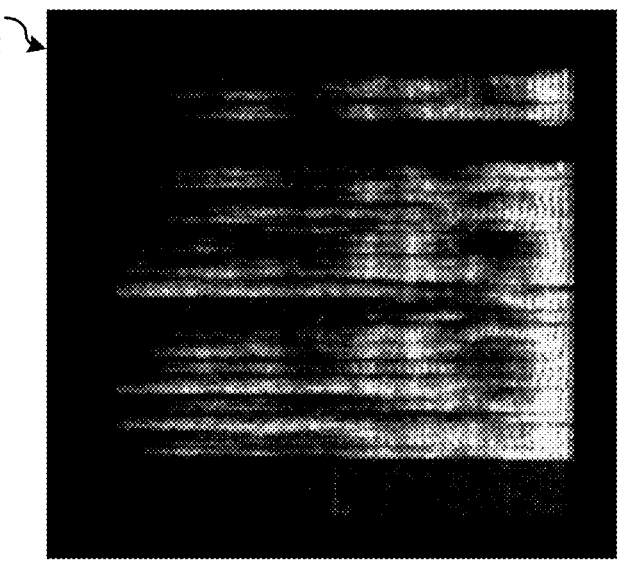
FIG. 5A illustrates an example of an audio spectrogram prior to processing the neural brush audio module in accordance with one or more embodiments.

FIG. 5A depicts an example of an audio color spectrum prior to processing the neural brush audio module in accordance with some embodiments. The audio color spectrum 502 depicts a generic sound profile for a drawing tool and digital canvas. As depicted in FIG. 5A, the sound profile exhibits a wide frequency spread (i.e., position on the vertical axis) with louder (e.g., brighter portion) in a wide band of frequencies over time. Time is depicted by the horizontal axis from left to right.

FIG. 5B depicts an example of an output audio color spectrum generated by the electronic drawings system in accordance with some embodiments. The audio color spectrum 504 depicts a visual representation of the output audio of the adjusted audio transformation model. As depicted in FIG. 5B, the loudness across a wide band of frequency is reduced and the details of the drawing inputs are more discernable as the total loudness is decreased with respect to the drawing strokes. As an example, in FIGS. 5A and 5B, loudness is illustrated using a brightness of the audio color spectrum with brighter portions indicating a louder noise.

The decrease in brightness (a visualization of decreasing loudness) between audio color spectrum 502 and audio color spectrum 504 depicts an improvement in detectability of the drawing inputs by limiting the loudest noise to a small set of frequencies (e.g., the bottom portion of the vertical axis). The audio color spectrum 504 illustrates a flow of various strokes while drawing a sample word from start to end.

Figure 6:
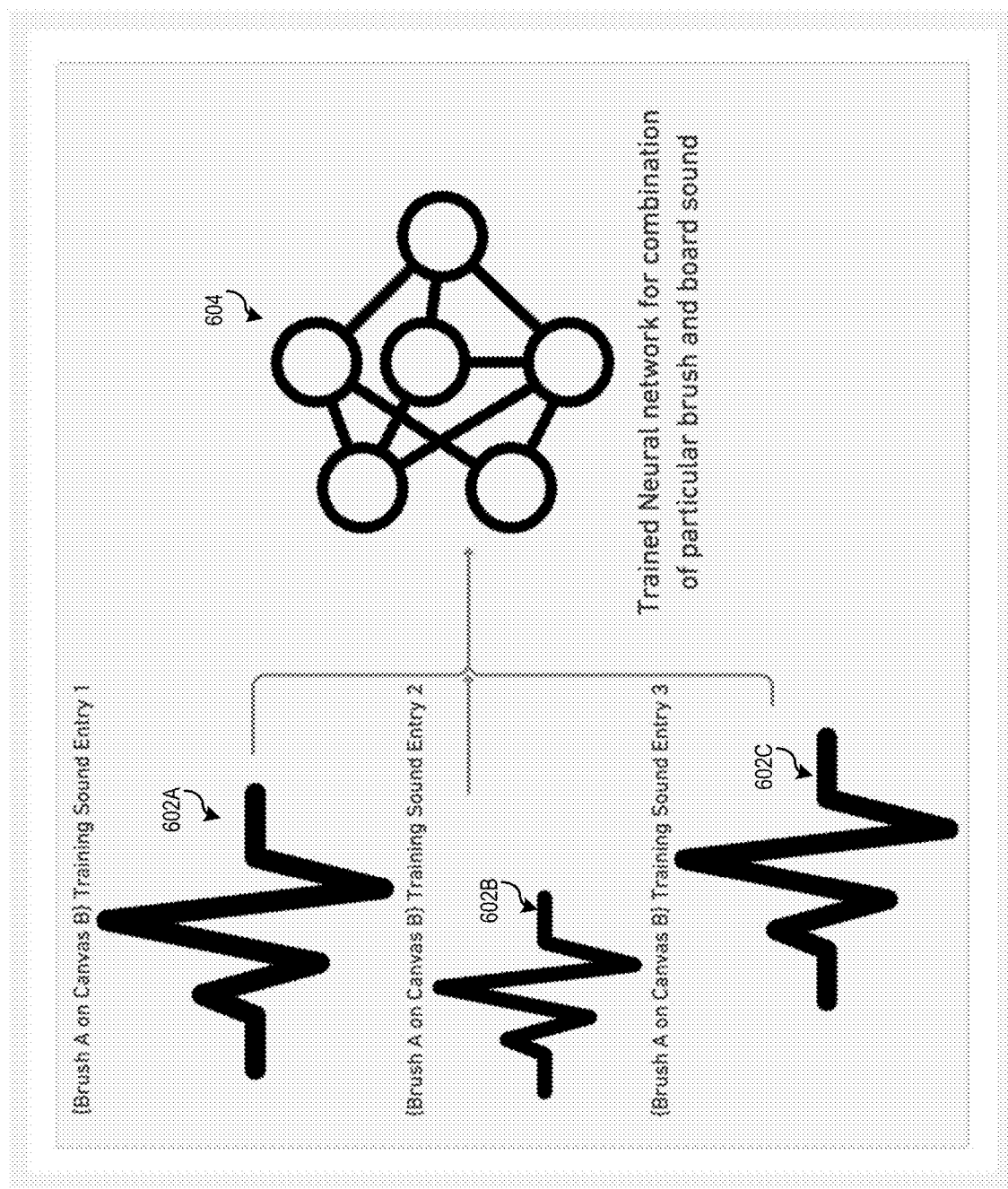
FIG. 6 illustrates an example of a training process for a neural network in accordance with one or more embodiments.

FIG. 6 illustrates a process of training a machine learning model in accordance with some embodiments. In various embodiments, training is performed using audio data (e.g., recordings) of interactions between a pair of drawing tool and digital canvas. The drawing tool and digital canvas may be labeled as ground truth data. As a result of the training, the machine learning model learns to generate intermediate audio representing interactions such as stroke, taps, or other drawing inputs that occur by the drawing tool on the digital canvas. Many machine learning models can be trained as needed to accommodate each pair of drawing tool and digital canvas. For instance, separate neural networks are trained for a combination of charcoal pencil and linen as compared to a combination of charcoal pencil and hardwood. As described above, the machine learning model is configured to receive one or more additional transformation layers from the network bending engine at inference time to provide a real-time representation of the user inputs being received. During the training process, the interactions between the drawing tool and digital canvas may be transposed by increasing or decreasing pitch, adjusting a gain of a particular interaction, or adjusting the timing of a training interaction. The machine learning model learns to generate audio focused on the combination of drawing tool and digital canvas including variations in speed, gain, and other factors that can be influenced by pressure, azimuth, or velocity of a stroke of a drawing tool. In some embodiments, the machine learning model can be a NEWT model a number of wave shaper MLPs. In other embodiments, the machine learning model can be a generic audio transformer model.

In one example, the machine learning model is trained on multiple training sounds, such as a first training sound 602A, a second training sound 602B, and a third training sound 602C, "training sounds 602". The training sounds 602 include different interactions between a combination of drawing tool and digital canvas. The trained machine learning model 604 learns to generate a sound representative of the combination of drawing tool and digital canvas.

Figure 7:
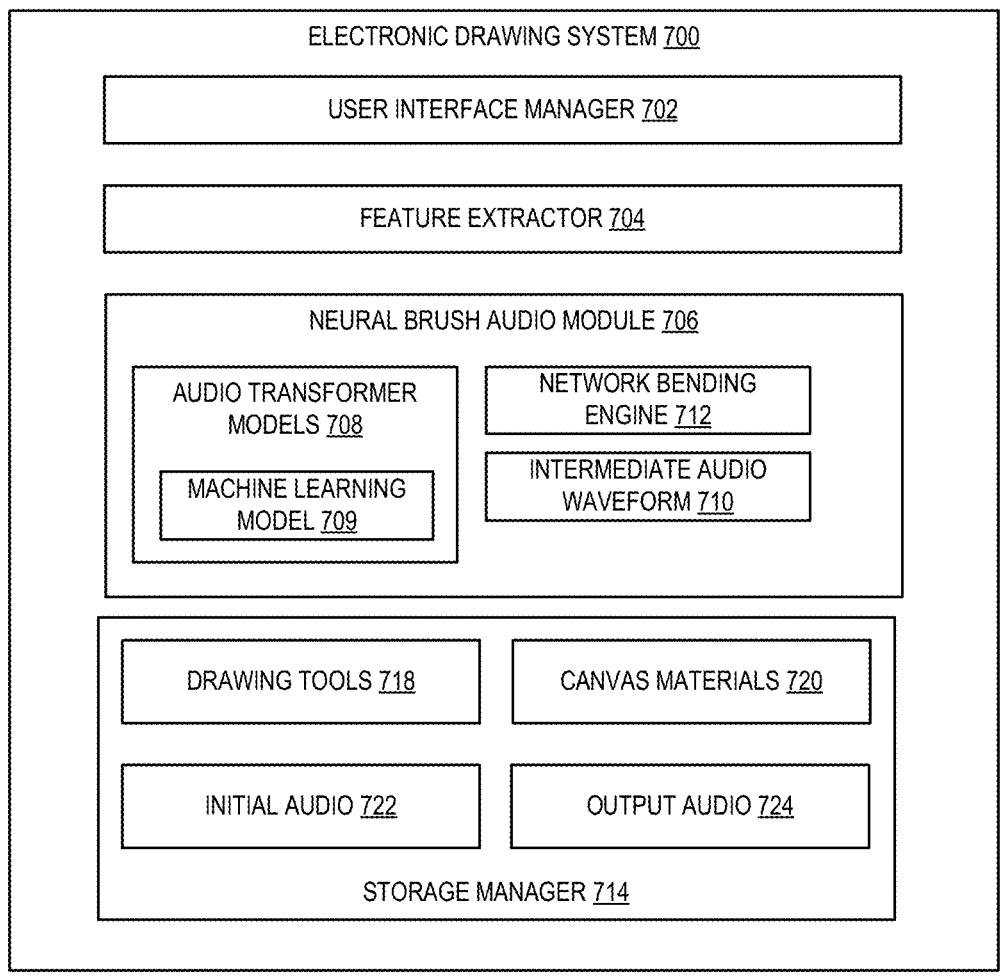
FIG. 7 illustrates a schematic diagram of an electronic drawing system in accordance with one or more embodiments.

FIG. 7 illustrates a schematic diagram of electronic drawing system 700 in accordance with one or more embodiments. As shown, electronic drawing system 700 may include, but is not limited to, a user interface manager 702, a feature extractor 704, a neural brush audio module 706, and a storage manager 714. The neural brush audio module 06 includes audio transformer models 708, intermediate audio waveform 710, and network bending engine 712. The electronic drawing system 700 includes storage manager 714 that includes drawing tools 718, digital canvas 720, initial audio 722, and output audio 724.

As illustrated in FIG. 7, the electronic drawing system 700 includes a user interface manager 702. For example, the user interface manager 702 allows users to provide drawing inputs to the electronic drawing system 700. In some embodiments, the user interface manager 702 provides a user interface through which the user interacts with a drawing tool and a digital canvas. Alternatively, or additionally, the user interface may enable the user to select a recording of a series of drawing input parameters, either by providing an address (e.g., a URL or other endpoint) associated with the remote file or connecting to a remote storage (e.g., cloud storage) that includes the recording. In some embodiments, the user interface manager 702 enables the user to select a specific drawing tool or digital canvas from a library of drawing tools or digital canvas, respectively. For example, the user interface may allow the user to select a charcoal pencil and a linen canvas and present the output audio 724 based on the user input.

The feature extractor 704 generates a set of parameters that represent the input of the drawing tool. For example, the feature extractor 108 can extract location (e.g., x-coordinate, y-coordinate), a pressure, an azimuth of the drawing tool 102, a velocity, a timestamp, environmental factors, and other features. The feature extractor 704 can receive the inputs of the drawing too, such as from a sensor of the electronic drawing system, or a coupled input surface as described above. In some embodiments, the feature extractor 704 can extract the set of parameters from raw inputs such as the input data described with regards to FIG. 3. The feature extractor 704 can perform pre-processing on the drawing inputs removing undesirable or erroneous input data. In some cases, the pre-processing includes performing a normalization, smoothing, or otherwise shaping the drawing inputs. The feature extractor 704 stores the set of parameters in a structure data element such as a JSON file or XML, file. The feature extractor 704 may subdivide the set of parameters based on the timestamp or a location of the input of the drawing tool.

The neural brush audio module 706 includes a set of audio transformer models 708, an intermediate audio waveform 710, and network bending engine 712. The neural brush audio module 706 controls the selection of a machine learning model 709, and the interaction between the network bending engine 712 and the machine learning model 709.

The audio transformer models 708 includes a library of trained machine learning models, such as machine learning model 709, that are trained to generate output audio from a particular combination of drawing tool and digital canvas. Each combination of drawing tool and digital canvas has a corresponding machine learning model. The machine learning models 709 may be trained as described with regards to FIG. 6.

The network bending engine 712 is configured to insert one or more additional transformation layers into the machine learning model 709 during inference time. The network bending engine 712 converts the real-time drawing inputs into additional layers for the machine learning model 709. The network bending engine 712 provides the machine learning model 709 flexibility to deviate from the training and be responsive to real-time drawing inputs received from the user.

The intermediate audio waveform 710 is generated by the machine learning model 709 to represent a generic mapping of the drawing tool and the digital canvas that can be manipulated during inference by network bending engine 712 to produce output audio 724. The intermediate audio waveform 710 can be any type of audio data, machine learning parameters, or other metadata that represent the combination of drawing tool and digital canvas.

The storage manager 714, as shown in FIG. 7, includes the drawing tools 718. The drawing tools 718 includes a selection of representations of physical drawing implements. For example, the drawing tools can include a selection of various writing materials such as charcoal, ink, or paint, as well as a selection of physical implements such as pencil, pen, paintbrush, finger, sponge, etc.

As further illustrated in FIG. 7, the storage manager 714 also includes digital canvas 720. The digital canvas 720 are a representation of physical drawing materials. For example, the digital canvas 720 include a selection of various drawing surfaces such as linen, hardwood, canvas, drywall, brick, or other physical materials that are represented by digital canvas 720.

The storage manager 714 may also include initial audio 722. The initial audio 722 may include a set of audio parameters for a generic white noise that is manipulated by neural brush audio module 706. The initial audio 722 can be any type of generic audio data such as any ambient colored noise.

The storage manager 714 may also include output audio 724. The output audio 724 represents the output of the neural brush audio module 706 that models the real-time drawing inputs received from the user, the drawing tool, and the digital canvas. The output audio 724 may be stored or presented by a speaker to the user during operation of the electronic drawing system 700.

Each of the components 702-714 of the electronic drawing system 700 and their corresponding elements (as shown in FIG. 7) may be in communication with one another using any suitable communication technologies. It will be recognized that although components 702-714 and their corresponding elements are shown to be separate in FIG. 7, any of components 702-714 and their corresponding elements may be combined into fewer components, such as into a single facility or module, divided into more components, or configured into different components that may serve a particular embodiment.

The components 702-714 and their corresponding elements can comprise software, hardware, or both. For example, the components 702-714 and their corresponding elements comprise one or more instructions stored on a computer-readable storage medium and executable by processors of one or more computing devices. When executed by the one or more processors, the computer-executable instructions of the electronic drawing system 700 cause a client device and/or a server device to perform the methods described herein. Alternatively, the components 702-714 and their corresponding elements can comprise hardware, such as a special purpose processing device to perform a certain function or group of functions. Additionally, the components 702-714 and their corresponding elements can comprise a combination of computer-executable instructions and hardware.

Furthermore, the components 702-714 of the electronic drawing system 700 may, for example, be implemented as one or more stand-alone applications, as one or more modules of an application, as one or more plug-ins, as one or more library functions or functions that may be called by other applications, and/or as a cloud-computing model. Thus, the components 702-710 of electronic drawing system 700 may be implemented as a stand-alone application, such as a desktop or mobile application. Furthermore, the components 702-710 of the electronic drawing system 700 may be implemented as one or more web-based applications hosted on a remote server. Alternatively, or additionally, the components of the electronic drawing system 700 may be implemented in a suit of mobile device applications or "apps."

Figure 8:
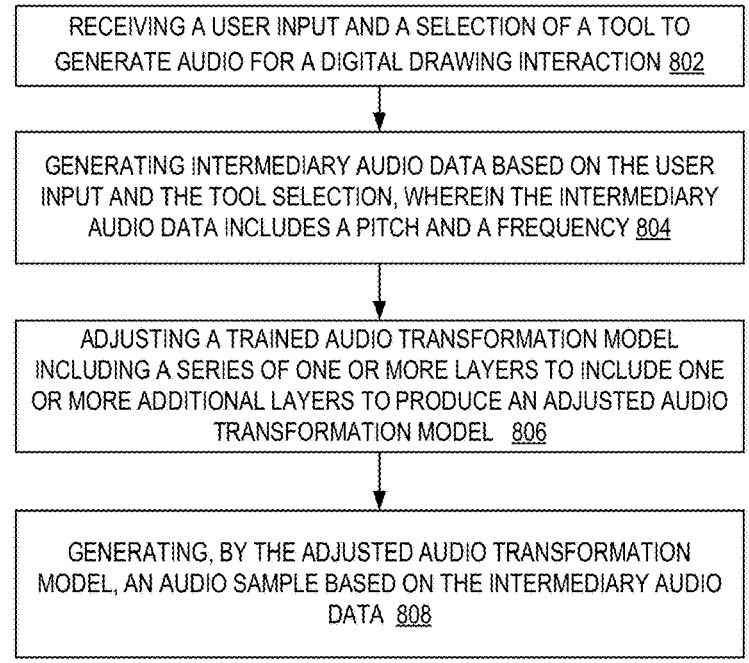
FIG. 8 illustrates a flowchart of a series of acts in a method of real time generative audio for brush and canvas interaction in digital drawing in accordance with one or more embodiments.

FIGS. 1-7, the corresponding text, and the examples, provide a number of different systems and devices that generate real-time audio feedback representative of the user input, the drawing tool, and the digital canvas. In addition to the foregoing, embodiments can also be described in terms of flowcharts comprising acts and steps in a method for accomplishing a particular result. For example, FIG. 8 illustrates a flowchart of an exemplary method in accordance with one or more embodiments. The method described in relation to FIG. 8 may be performed with fewer or more steps/acts or the steps/acts may be performed in differing orders. Additionally, the steps/acts described herein may be repeated or performed in parallel with one another or in parallel with different instances of the same or similar steps/acts.

FIG. 8 illustrates a flowchart 800 of a series of acts in a method of generating an audio sample in accordance with one or more embodiments. In one or more embodiments, the method 800 is performed in a digital medium environment that includes the electronic drawing system 700. The method 800 is intended to be illustrative of one or more methods in accordance with the present disclosure and is not intended to limit potential embodiments. Alternative embodiments can include additional, fewer, or different steps than those articulated in FIG. 8.

As illustrated in FIG. 8, the method 800 includes an act 802 of receiving a user input and selection of a tool to generate audio for a digital drawing interaction. The electronic drawing system may include a plurality of selectable drawing tools and digital canvas. The user selects a drawing tool and a digital canvas on which the drawing inputs are to be applied. In some embodiments, the user input and a drawing tool includes a digital canvas, a stroke interaction, and a representation of a physical drawing implement. The electronic drawing system receives the user inputs via a touchscreen, user interface, or other input surface configured to receive user inputs.

In some embodiments, the method 800 can include an act 804 of generating intermediary audio data based on the user input and the tool selection. The electronic drawing system generates the intermediary audio data using a machine learning model trained to produce sound based on a particular combination of digital canvas and drawing tool. In some embodiments, generating the intermediary audio data includes generating a white-noise signal, applying a filter to the white-noise signal to create a filtered white-noise signal; and extracting input parameters from the user input, wherein the input parameters comprise an azimuth, a pressure, and a velocity of the tool. The electronic drawing system further converts the input parameters into a structured data element and applies the input parameters in the structured data element to the filtered white-noise signal. In some examples, applying the input includes determining a fixed bandwidth parameter, adjusting a center frequency parameter based on the input parameters, and adjusting a gain parameter based on the input parameters. The center frequency parameter is computed from a combination of azimuth, brush velocity, and pressure.

In some embodiments, the method 800 can include an act 806 of adjusting a trained audio transformation model including a series of one or more layers to include one or more additional layers to produce an adjusted audio transformation model. The network bending engine inserts one or more deterministic transformation layers into the machine learning model during inference. The network bending engine manipulates the machine learning model in real-time based on the drawing inputs of the drawing tool. In some embodiments, adjusting the trained audio transformation model includes inserting a plurality of deterministically controlled transformation layers into a computational graph associated with the transformation model, wherein each deterministically controlled transformation layer is applied to each activation map of the trained audio transformation model individually before they are passed to a subsequent layer of the trained audio transformation model.

In some embodiments, the method 800 can include an act 808 of generating, by the adjusted audio transformation model, an audio sample based on the intermediary audio data. The machine learning model, including the one or more additional layers inserted by network bending engine, generates an audio sample that represents the real time drawing inputs received from the user interaction with the drawing tool and the digital canvas, and the combination of drawing tool and digital canvas. In some embodiments, the audio sample can provide output sensory feedback to a multimedia presentation device, wherein the sensory feedback is generated in real time based on the audio sample. An example of a multimedia presentation device includes, but is not limited to, any computing device capable of presenting audio and visual data, such as desktop computer, mobile device, laptop computer, tablet, a virtual reality device, or any other audio-visual presentation device.

Figure 9:
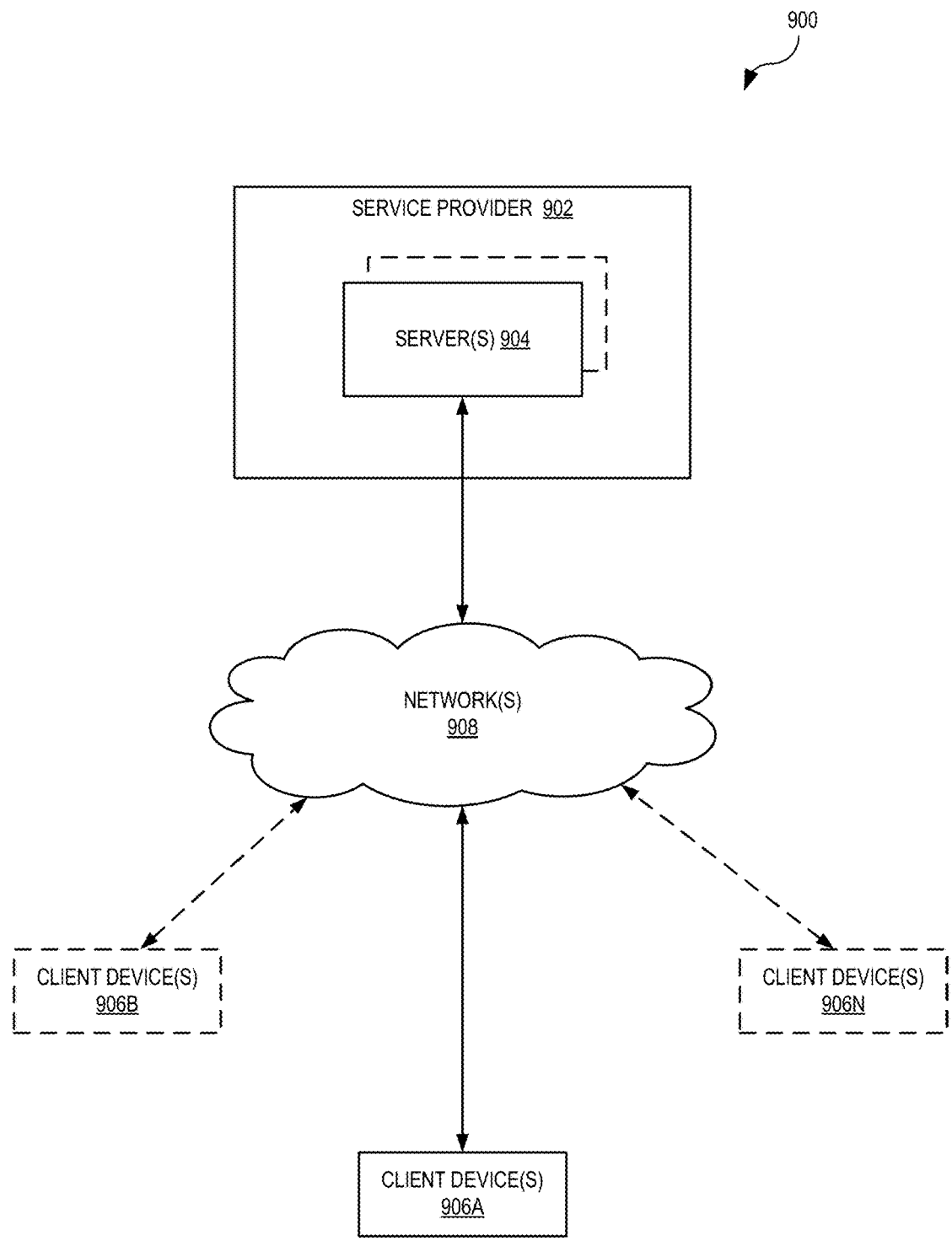
FIG. 9 illustrates a schematic diagram of an exemplary environment in which the electronic drawing system can operate in accordance with one or more embodiments.

FIG. 9 illustrates a schematic diagram of an exemplary environment 900 in which the electronic drawing system 700 can operate in accordance with one or more embodiments. In one or more embodiments, the environment 900 includes a service provider 902 which may include one or more servers 904 connected to a plurality of client devices 906A-906N via one or more networks 908. The client devices 906A-906N, the one or more networks 908, the service provider 902, and the one or more servers 904 may communicate with each other or other components using any communication platforms and technologies suitable for transporting data and/or communication signals, including any known communication technologies, devices, media, and protocols supportive of remote data communications, examples of which will be described in more detail below with respect to FIG. 10.

Although FIG. 9 illustrates a particular arrangement of the client devices 906A-906N, the one or more networks 908, the service provider 902, and the one or more servers 904, various additional arrangements are possible. For example, the client devices 906A-906N may directly communicate with the one or more servers 904, bypassing the network 908. Or alternatively, the client devices 906A-906N may directly communicate with each other. The service provider 902 may be a public cloud service provider which owns and operates their own infrastructure in one or more data centers and provides this infrastructure to customers and end users on demand to host applications on the one or more servers 904. The servers may include one or more hardware servers (e.g., hosts), each with its own computing resources (e.g., processors, memory, disk space, networking bandwidth, etc.) which may be securely divided between multiple customers, each of which may host their own applications on the one or more servers 904. In some embodiments, the service provider may be a private cloud provider which maintains cloud infrastructure for a single organization. The one or more servers 904 may similarly include one or more hardware servers, each with its own computing resources, which are divided among applications hosted by the one or more servers for use by members of the organization or their customers.

Similarly, although the environment 900 of FIG. 9 is depicted as having various components, the environment 900 may have additional or alternative components. For example, the environment 900 can be implemented on a single computing device with the electronic drawing system 700. In particular, the electronic drawing system 700 may be implemented in whole or in part on the client device 902A.

As illustrated in FIG. 9, the environment 900 may include client devices 906A-906N. The client devices 906A-906N may comprise any computing device. For example, client devices 906A-906N may comprise one or more personal computers, laptop computers, mobile devices, mobile phones, tablets, special purpose computers, TVs, or other computing devices, including computing devices described below with regards to FIG. 10. Although three client devices are shown in FIG. 9, it will be appreciated that client devices 906A-906N may comprise any number of client devices (greater or fewer than shown).

Moreover, as illustrated in FIG. 9, the client devices 906A-906N and the one or more servers 904 may communicate via one or more networks 908. The one or more networks 908 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 908 may be any suitable network over which the client devices 906A-906N may access service provider 902 and server 904, or vice versa. The one or more networks 908 will be discussed in more detail below with regards to FIG. 10.

In addition, the environment 900 may also include one or more servers 904. The one or more servers 904 may generate, store, receive, and transmit any type of data, including drawing tools 718, digital canvas 720, initial audio 722, output audio 724, or other information. For example, a server 904 may receive data from a client device, such as the client device 906A, and send the data to another client device, such as the client device 902B and/or 902N. The server 904 can also transmit electronic messages between one or more users of the environment 900. In one example embodiment, the server 904 is a data server. The server 904 can also comprise a communication server or a web-hosting server. Additional details regarding the server 904 will be discussed below with respect to FIG. 10.

As mentioned, in one or more embodiments, the one or more servers 904 can include or implement at least a portion of the electronic drawing system 700. In particular, the electronic drawing system 700 can comprise an application running on the one or more servers 904 or a portion of the electronic drawing system 700 can be downloaded from the one or more servers 904. For example, the electronic drawing system 700 can include a web hosting application that allows the client devices 906A-906N to interact with content hosted at the one or more servers 904. To illustrate, in one or more embodiments of the environment 900, one or more client devices 906A-906N can access a webpage supported by the one or more servers 904. In particular, the client device 906A can run a web application (e.g., a web browser) to allow a user to access, view, and/or interact with a webpage or web site hosted at the one or more servers 904.

Upon the client device 906A accessing a webpage or other web application hosted at the one or more servers 904, in one or more embodiments, the one or more servers 904 can provide access to one or more electronic documents 920 stored at the one or more servers 904. Moreover, the client device 906A can receive a request (i.e., via user input) to draw with a drawing tool on a digital canvas and provide the request to the one or more servers 904. Upon receiving the request, the one or more servers 904 can automatically perform the methods and processes described above to generate output audio representative of the drawing tool, digital canvas, and real-time raw drawing parameters. The one or more servers 904 can provide all or portions of output audio 724, to the client device 906A for presentation to the user.

As just described, the electronic drawing system 700 may be implemented in whole, or in part, by the individual elements 902-908 of the environment 900. It will be appreciated that although certain components of the electronic drawing system 700 are described in the previous examples with regard to particular elements of the environment 900, various alternative implementations are possible. For instance, in one or more embodiments, the electronic drawing system 700 is implemented on any of the client devices 906A-N. Similarly, in one or more embodiments, the electronic drawing system 700 may be implemented on the one or more servers 904. Moreover, different components and functions of the electronic drawing system 700 may be implemented separately among client devices 906A-906N, the one or more servers 904, and the network 908.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
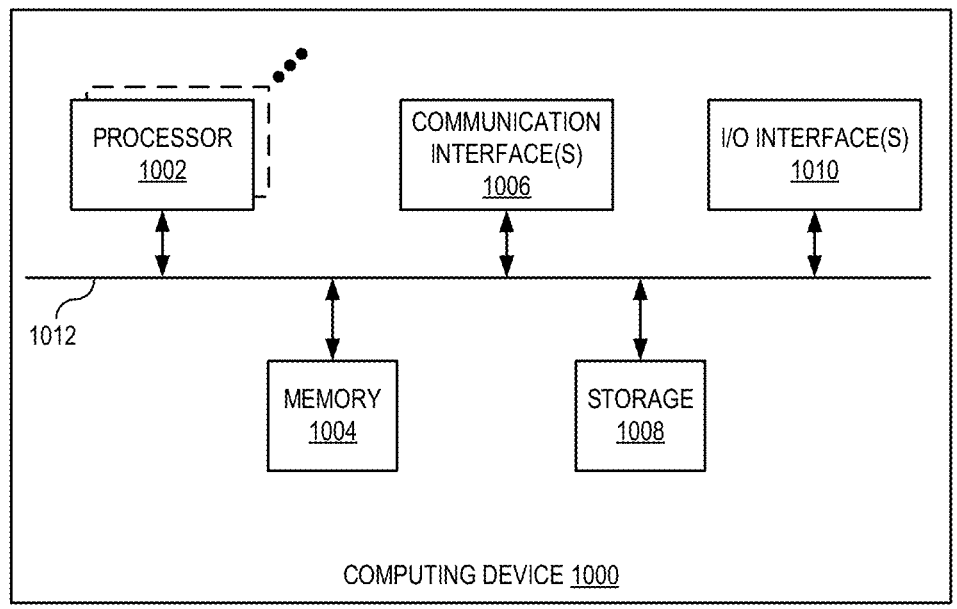
FIG. 10 illustrates a block diagram of an exemplary computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the electronic drawing system. As shown by FIG. 10, the computing device can comprise a processor 1002, memory 1004, one or more communication interfaces 1006, a storage device 1008, and one or more I/O devices/interfaces 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example, and not by way of limitation, to execute instructions, processor(s) 1002 may retrieve (or fetch) the instructions from an internal register, an internal cache, memory 1004, or a storage device 1008 and decode and execute them. In various embodiments, the processor(s) 1002 may include one or more central processing units (CPUs), graphics processing units (GPUs), field programmable gate arrays (FPGAs), systems on chip (SoC), or other processor(s) or combinations of processors.

The computing device 1000 includes memory 1004, which is coupled to the processor(s) 1002. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 can further include one or more communication interfaces 1006. A communication interface 1006 can include hardware, software, or both. The communication interface 1006 can provide one or more interfaces for communication (such as, for example, packet-based communication) between the computing device and one or more other computing devices 1000 or one or more networks. As an example, and not by way of limitation, communication interface 1006 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

The computing device 1000 includes a storage device 1008 includes storage for storing data or instructions. As an example, and not by way of limitation, storage device 1008 can comprise a non-transitory storage medium described above. The storage device 1008 may include a hard disk drive (HDD), flash memory, a Universal Serial Bus (USB) drive or a combination of these or other storage devices. The computing device 1000 also includes one or more input or output ("I/O") devices/interfaces 1010, which are provided to allow a user to provide input to (such as user strokes), receive output from, and otherwise transfer data to and from the computing device 1000. These I/O devices/interfaces 1010 may include a mouse, keypad or a keyboard, a touch screen, camera, optical scanner, network interface, modem, other known I/O devices or a combination of such I/O devices/interfaces 1010. The touch screen may be activated with a stylus or a finger.

The I/O devices/interfaces 1010 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1010 is configured to provide graphical data to a display for presentation to a user. The graphical data may be representative of one or more graphical user interfaces and/or any other graphical content that may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving a user input and a selection of a tool to generate audio for a digital drawing interaction;
generating intermediary audio data based on the user input and the tool selection, wherein the intermediary audio data includes a pitch and a frequency;
adjusting a trained audio transformation model including a series of one or more layers to include one or more additional layers to produce an adjusted audio transformation model; and
generating, by the adjusted audio transformation model, an audio sample based on the intermediary audio data.

2. The method of claim 1, wherein generating intermediary audio data comprises:
generating a white-noise signal;
applying a filter to the white-noise signal to create a filtered white-noise signal; and
extracting input parameters from the user input, wherein the input parameters comprise an azimuth, a pressure, and a velocity of the tool.

3. The method of claim 2, further comprising:
converting the input parameters into a structured data element;
applying the input parameters in the structured data element to the filtered white-noise signal, wherein applying the input parameters comprises:
determining a fixed bandwidth parameter;
adjusting a center frequency parameter based on the input parameters; and
adjusting a gain parameter based on the input parameters.

4. The method of claim 3, wherein the center frequency parameter is computed from a combination of azimuth, brush velocity, and pressure.

5. The method of claim 3, wherein adjusting the trained audio transformation model comprises:
inserting a plurality of deterministically controlled transformation layers into a computational graph associated with the transformation model, wherein each deterministically controlled transformation layer is applied to each activation map of the trained audio transformation model individually before they are passed to a subsequent layer of the trained audio transformation model.

6. The method of claim 1, further comprising outputting sensory feedback to a multimedia presentation device, wherein the sensory feedback is generated in real time based on the audio sample.

7. The method of claim 1, wherein the user input and selection of a drawing tool comprise a digital canvas, a stroke interaction, and a representation of a physical drawing implement.

8. A non-transitory computer-readable storage medium including instructions stored thereon which, executed by at least one processor, cause the at least one processor to perform operations comprising:
receiving a selection of a drawing tool;
receiving a user input that represents a digital drawing interaction between a digital canvas and the drawing tool;
selecting a trained audio transformation model from a plurality of trained audio transformation models, wherein the trained audio transformation model is trained for a combination of the digital canvas and the drawing tool;
providing the user input to the trained audio transformation model;
modifying the trained audio transformation model using network bending to insert one or more layers into the trained audio transformation model; and
generating an audio sample using the trained audio transformation model.

9. The non-transitory computer-readable storage medium of claim 8, the operations further comprising:
converting the user input into a structured data element, wherein the structured data element comprises an azimuth, velocity, and pressure;
generating intermediary audio data using the user input;
modifying the intermediary audio data using the structured data element, the modifying comprising:
adjusting a center frequency parameter of the intermediary audio data; and
adjusting a gain parameter of the intermediary audio data.

10. The non-transitory computer-readable storage medium of claim 9, the operations further comprising computing the center frequency parameter using a combination of azimuth, brush velocity, and pressure.

11. The non-transitory computer-readable storage medium of claim 8, wherein the operation of modifying the trained audio transformation model using network bending to insert one or more layers into the trained audio transformation model further comprises:
inserting a plurality of deterministically controlled transformation layers into a computational graph of the trained audio transformation model by applying each deterministically controlled transformation layer to an activation map of the trained audio transformation model.

12. The non-transitory computer-readable storage medium of claim 8, the operations further comprising outputting the audio sample.

13. The non-transitory computer-readable storage medium of claim 8, wherein the user input comprises a stroke interaction representing a drawing input by a drawing implement on the digital canvas.

14. A system comprising:
a memory component; and
a processing device coupled to the memory component, the processing device to perform operations comprising:
receiving a user input and a selection of a tool;
generating intermediary audio data based on the user input and the tool selection, wherein the intermediary audio data includes a pitch and a frequency;
adjusting a trained audio transformation model including a series of one or more layers to include one or more additional layers to produce an adjusted audio transformation model; and
generating, by the adjusted audio transformation model, an audio sample based on the intermediary audio data.

15. The system of claim 14, the operation of generating intermediary audio data causing the processing device to perform operations comprising:
generating a white-noise signal;
applying a filter to the white-noise signal to create a filtered white-noise signal; and
extracting input parameters from the user input, wherein the input parameters comprise an azimuth, a pressure, and a velocity of the tool.

16. The system of claim 15, the operations further comprising:
converting the input parameters into a structured data element;
applying the input parameters in the structured data element to the filtered white-noise signal, wherein applying the input comprises:
determining a fixed bandwidth parameter;
adjusting a center frequency parameter based on the input parameters; and
adjusting a gain parameter based on the input parameters.

17. The system of claim 16, wherein the center frequency parameter is computed from a combination of azimuth, brush velocity, and pressure.

18. The system of claim 14, wherein the operation of adjusting the series of one or more layers of the trained audio transformation model to include one or more additional layers causes the processing device to perform operations comprising:
- inserting a plurality of deterministically controlled transformation layers into a computational graph associated with the transformation model, wherein each deterministically controlled transformation layer is applied to each activation map of the trained audio transformation model individually before they are passed to a subsequent layer of the trained audio transformation model.

19. The system of claim 14, the operations further comprising outputting sensory feedback to a multimedia presentation device, wherein the sensory feedback is generated in real time based on the audio sample.

20. The system of claim 14, wherein the user input and selection of a drawing tool comprise a digital canvas, a stroke interaction, and a representation of a physical drawing implement.

\* \* \* \* \*